United States Patent [19]

Wolens

[11] Patent Number: 4,482,196

[45] Date of Patent: Nov. 13, 1984

[54] APPLIANCE CADDY

[76] Inventor: John Wolens, 1000 N. Lake Shore Dr., Apt. 4B, Chicago, Ill. 60611

[21] Appl. No.: 488,202

[22] Filed: Apr. 25, 1983

[51] Int. Cl.³ .................... H01R 35/00; A47B 11/00
[52] U.S. Cl. .................................. 339/2 R; 108/140; 108/142
[58] Field of Search ............. 339/1 R, 2 R, 2 A, 2 L; 108/139, 140, 142, 152

[56] References Cited

U.S. PATENT DOCUMENTS

| | | | |
|---|---|---|---|
| 1,683,944 | 9/1928 | Balch | 108/152 X |
| 1,894,991 | 1/1933 | Hayes | 108/140 X |
| 2,740,678 | 4/1956 | Campbell | 108/140 |
| 4,146,281 | 3/1979 | Quartarone | 339/2 R |
| 4,307,672 | 12/1981 | Shikimi | 108/139 |

Primary Examiner—John McQuade
Assistant Examiner—Steven C. Bishop
Attorney, Agent, or Firm—Niro, Jager & Scavone

[57] ABSTRACT

A Structure for supporting household appliances includes a cantilever arm pivotally mounted to a wall or other support, a platform rotatably mounted to the end of the arm, electrical hardware providing electrical outlets on or in the platform, and means to limit the rotation of the platform on the arm to less than 360°.

5 Claims, 4 Drawing Figures

APPLIANCE CADDY

BACKGROUND OF THE INVENTION

The present invention relates to apparatus for use in the home to support small appliances, tools or other portable items. More particularly, the present invention relates to a wall mounted, movable and electrically wired appliance tray or "caddy" which provides a convenient storage and/or operating place for items carried by the caddy.

SUMMARY OF THE INVENTION

The apparatus of the present invention is ideally suited for use in the kitchen, bath or workroom of the home and serves as both a supporting structure and electrical source for small appliances. The apparatus includes a cantilever arm having base and end portions, and a platform rotatably mounted to the cantilever arm. The base portion of the arm is adapted to pivot through approximately 180° when mounted to a vertical surface or other support structure. The end portion is, in turn, pivotally mounted to the base portion. The platform is provided with one or more electrical receptacles which are connected to an electrical conductor threaded through the cantilever arm and extending from the base portion with a conventional electrical plug at its end. Finally, the caddy includes means for limiting the rotation of the platform to less than 360°.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

DETAILED DESCRIPTION OF THE PREFERRED EMBODIMENTS

Figure 1:
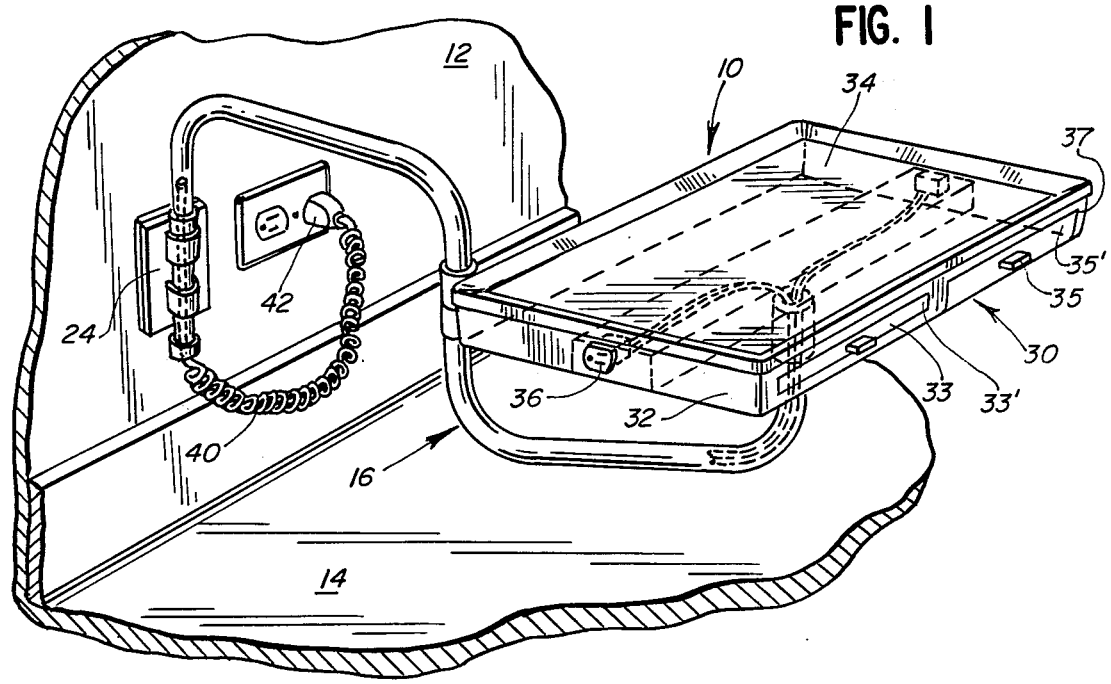
FIG. 1 is a perspective view illustrating the appliance caddy of the present invention as mounted to a vertical wall surface and extended from the wall.
Figure 2:
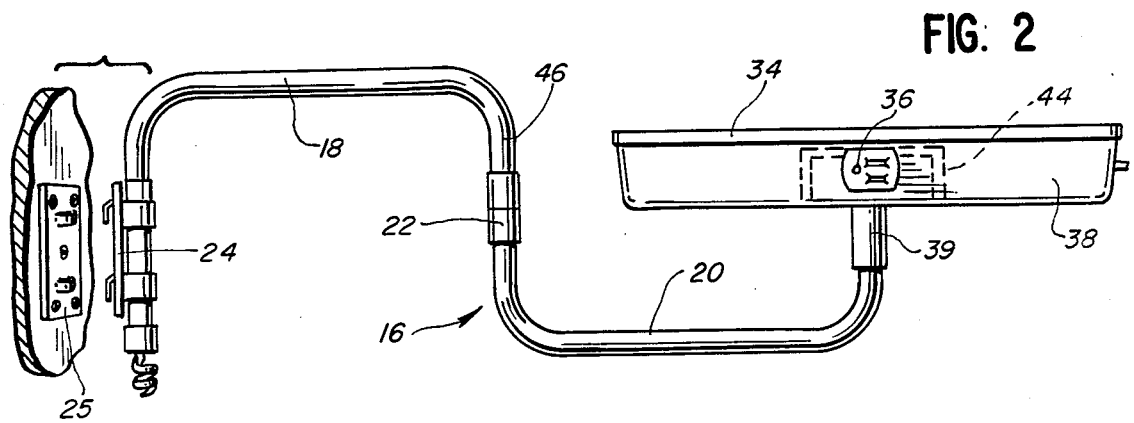
FIG. 2 is a side elevation of the appliance caddy, again in extended position, and also showing the structure used for mounting the caddy to a wall.

Referring to FIGS. 1 and 2, the appliance caddy of the present invention, designated generally as 10, is shown mounted to a wall surface 12 and elevated from a counter top or other work surface 14. The caddy 10 includes a cantilever arm 16 which includes at least two separate segments, a base portion 18 and end portion 20, joined by a rotatable collar 22. The base portion 18 is mounted to wall 12 in such a manner that it can pivot about its mounting bracket 24 through approximately 180°. In the illustrated preferred embodiment, the base and end portions 18 and 20 are generally U-shaped and together define a mid-portion 46 of cantilever arm 16.

The caddy 10 also includes a platform 30 which, in the preferred embodiment, includes a bottom housing 32 and removable upper support surface 34. The platform is provided with one or more electrical receptacles 36, preferably mounted in the sidewalls 38 of the bottom housing 32. The end portion 20 of cantilever arm 16 supports the platform 30 via a rotatable collar 39 which is preferably positioned in the central area of the platform.

The bottom housing 32 may also include one or more trays or drawers, 33 and 35 respectively, which fit into suitable openings 33 and 35 in side wall 37 of housing 32.

An electrical conductor 40 is threaded through cantilever arm 16, having a conventional wall plug 42 at its free end and at its other end connecting to the receptacles 36. The wiring within platform 30 should be enclosed by a suitable structure, such as channel 44, particularly where the supporting surface 34 is removable.

The appliance supporting apparatus of the present invention also includes means for limiting the movement of rotation of the platform 30 to less than 360°. This feature is necessary to preserve the integrity of the electrical wiring and to thus insure that the apparatus does not short circuit. In the preferred embodiment illustrated in the drawings, the rotation limiting means comprises the generally vertical mid-portion 46 of cantilever arm 16 which acts as a mechanical stop to restrain rotation of platform 30 as is clearly illustrated in FIG. 4. In order for such an arrangement to function as required, the dimension between the pivot point 50 defined by collar 39 and mid-portion 46 (see A in FIG. 2) must be less than the dimension between pivot point 50 and the outermost extremity of platform 30 (see B in FIG. 4).

The cantilever arm 16 may be mounted to wall 12 via bracket 24 and wall plate 25 in a conventional manner as is well understood by those skilled in the art.

Figure 3:
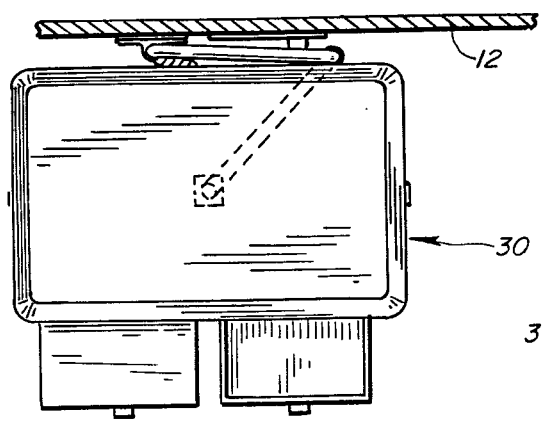
FIG. 3 is a top view illustrating the caddy when positioned adjacent its mounting wall.
Figure 4:
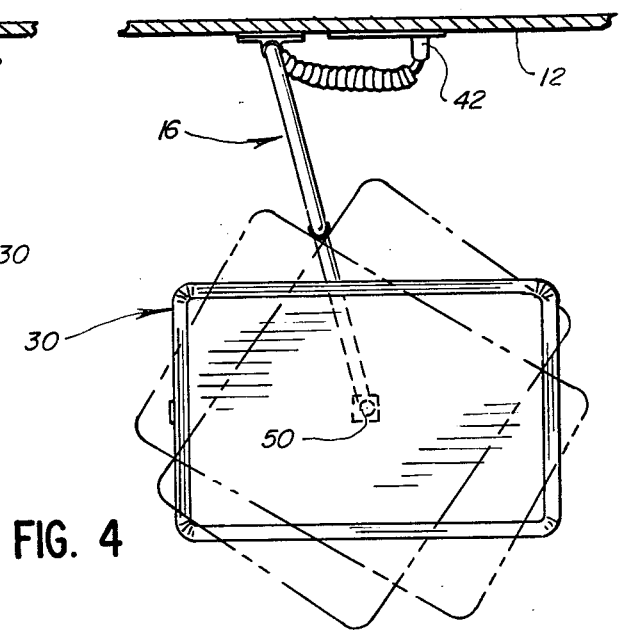
FIG. 4 is a top view illustrating the caddy as mounted and positioned in FIG. 1.

As can be seen most clearly in FIGS. 3 and 4, the appliance caddy 10 may be positioned adjacent wall 12 for convenient storage or extended from the wall when access to the appliances carried by the caddy is necessary or desirable.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An apparatus for supporting small appliances comprising:

a cantilever arm having a base portion adapted for pivotal movement when mounted to a support structure, and an end portion pivotally connected to said base portion;

a platform rotatably mounted to the end portion of said cantilever arm and including at least one electrical receptacle;

an electrical conductor housed within said cantilever arm, one end of said conductor terminating at said receptacle and the other end extending from the base portion of the cantilever arm and terminating in an electrical plug; and means for limiting the rotation of said platform on said cantilever arm to less than 360°.

2. The apparatus of claim 1 wherein said base and end portions are generally U-shaped and together form a generally vertical mid-portion of said cantilever arm, said mid-portion comprising a mechanical stop to prevent unrestricted rotation of said platform.

3. The apparatus of claim 1 wherein said platform includes a bottom housing and a removable upper support surface.

4. The apparatus of claim 1 wherein said end portion includes an upstanding extremity which is joined to the central portion of said platform by means of a rotatable connection.

5. The apparatus of claim 1 wherein said rotation limiting means comprises a portion of said cantilever arm which mechanically restricts rotation of said platform.

* * * * *